US010097425B2

(12) United States Patent
Yamauchi et al.

(10) Patent No.: US 10,097,425 B2
(45) Date of Patent: Oct. 9, 2018

(54) DATA NETWORK MANAGEMENT SYSTEM, DATA NETWORK MANAGEMENT APPARATUS, DATA PROCESSING APPARATUS, AND DATA NETWORK MANAGEMENT METHOD

(71) Applicant: FUJITSU LIMITED, Kawasaki-shi, Kanagawa (JP)

(72) Inventors: Hiromasa Yamauchi, Kawasaki (JP); Koichiro Yamashita, Hachioji (JP); Takahisa Suzuki, Yokohama (JP); Toshiya Otomo, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 165 days.

(21) Appl. No.: 14/979,417

(22) Filed: Dec. 27, 2015

(65) Prior Publication Data

US 2016/0112280 A1 Apr. 21, 2016

Related U.S. Application Data

(63) Continuation of application No. PCT/JP2013/068447, filed on Jul. 4, 2013.

(51) Int. Cl.

| | |
|---|---|
| ***G06F 15/173*** | (2006.01) |
| ***H04L 12/24*** | (2006.01) |
| ***H04W 24/02*** | (2009.01) |

(52) U.S. Cl.

CPC ............ *H04L 41/32* (2013.01); *H04L 41/085* (2013.01); *H04L 41/28* (2013.01); *H04W 24/02* (2013.01)

(58) Field of Classification Search

CPC ......... H04L 41/32; H04L 41/28; H04W 24/02

(Continued)

(56) References Cited

U.S. PATENT DOCUMENTS

| | | | |
|---|---|---|---|
| 7,020,701 | B1 | 3/2006 | Gelvin et al. |
| 2001/0029529 | A1 | 10/2001 | Tachibana et al. |

(Continued)

FOREIGN PATENT DOCUMENTS

| | | |
|---|---|---|
| JP | 2001-282734 | 10/2001 |
| JP | 2001282734 A * | 10/2001 |

(Continued)

OTHER PUBLICATIONS

Translation of JP2001/282734A from espacenet.*

(Continued)

*Primary Examiner* — Liangche A Wang
*Assistant Examiner* — Kaylee Huang
(74) *Attorney, Agent, or Firm* — Fujitsu Patent Center

(57) ABSTRACT

A data network management system includes a data network management apparatus; and plural data processing apparatuses installed in an installation area and configured to transmit data to the data network management apparatus. The plural data processing apparatuses transmit identification information thereof together with the processed data to the data network management apparatus. The data network management apparatus determines based on identification information of data processing apparatuses that have completed a given authentication test among the plural data processing apparatuses and the identification information obtained from the plural data processing apparatuses installed in the installation area, a first data processing apparatus from which the data is to be obtained among the plural data processing apparatuses.

10 Claims, 11 Drawing Sheets

(58) Field of Classification Search
USPC .......................................... 709/220, 223, 224
See application file for complete search history.

(56) References Cited

U.S. PATENT DOCUMENTS

| | | | | |
|---|---|---|---|---|
| 2002/0019725 | A1 | 2/2002 | Petite | |
| 2002/0103860 | A1* | 8/2002 | Terada | G06Q 30/02 709/203 |
| 2003/0061345 | A1* | 3/2003 | Kawasaki | H04L 41/06 709/224 |
| 2005/0063326 | A1 | 3/2005 | Ohkuma et al. | |
| 2005/0177633 | A1* | 8/2005 | Plunkett | B41J 2/04505 709/225 |
| 2006/0023643 | A1 | 2/2006 | Lim | |
| 2006/0241884 | A1* | 10/2006 | Sathe | H04L 43/50 702/108 |
| 2007/0036090 | A1 | 2/2007 | Bhatti | |
| 2007/0198708 | A1 | 8/2007 | Moriwaki et al. | |
| 2007/0299624 | A1 | 12/2007 | Motobayashi et al. | |
| 2008/0002606 | A1 | 1/2008 | Cheung et al. | |
| 2008/0165761 | A1 | 7/2008 | Goppner et al. | |
| 2008/0215609 | A1 | 9/2008 | Cleveland et al. | |
| 2008/0278769 | A1* | 11/2008 | Poirier | H04N 1/2307 358/406 |
| 2009/0024272 | A1 | 1/2009 | Rogers et al. | |
| 2009/0201896 | A1 | 8/2009 | Davis et al. | |
| 2010/0085969 | A1 | 4/2010 | Aoki et al. | |
| 2010/0124209 | A1 | 5/2010 | In et al. | |
| 2010/0318641 | A1 | 12/2010 | Bullard et al. | |
| 2011/0055928 | A1* | 3/2011 | Brindza | H04W 12/08 726/26 |
| 2011/0153865 | A1 | 6/2011 | Hong et al. | |
| 2012/0059903 | A1 | 3/2012 | Kim | |
| 2012/0188057 | A1 | 7/2012 | Green et al. | |
| 2013/0184008 | A1 | 7/2013 | Terada et al. | |
| 2013/0242929 | A1 | 9/2013 | Gorgen et al. | |
| 2013/0276144 | A1* | 10/2013 | Hansen | G06F 21/60 726/29 |
| 2013/0324165 | A1 | 12/2013 | Fujiwara et al. | |
| 2014/0026161 | A1* | 1/2014 | Zheng | H04N 21/25816 725/29 |
| 2014/0254433 | A1 | 9/2014 | Abe et al. | |
| 2015/0178699 | A1* | 6/2015 | Wada | G06Q 30/04 705/40 |

FOREIGN PATENT DOCUMENTS

| | | |
|---|---|---|
| JP | 2003-242653 | 8/2003 |
| JP | 2004-096906 | 3/2004 |
| JP | 2005-204016 | 7/2005 |
| JP | 2006-42370 | 2/2006 |
| JP | 2006-067377 | 3/2006 |
| JP | 2007-174303 | 7/2007 |
| JP | 2008-176502 | 7/2008 |
| JP | 2008-244756 | 10/2008 |
| JP | 2009-005136 | 1/2009 |
| JP | 2009-505445 | 2/2009 |
| JP | 2009-159619 | 7/2009 |
| JP | 2009-188930 | 8/2009 |
| JP | 2009-250627 | 10/2009 |
| JP | 2010-141469 | 6/2010 |
| TW | 200803388 | 1/2008 |
| TW | 201228315 | 7/2012 |
| WO | 2008/062724 A1 | 5/2008 |

OTHER PUBLICATIONS

USOA—Final Rejection of related U.S. Appl. No. 14/603,718 dated Jan. 25, 2017.

JPOA—Office Action of Japanese Patent Application No. 2015-524983 dated Feb. 21, 2017, with full machine translation of the Office Action.

English-language translation of ISR, for PCT/JP2013/068447 [dated Jul. 30, 2013] 2pp.

English-language translation of the relevant portion of IPRP for PCT/JP2013/068447 [dated Aug. 6, 2013], 7pp.

English-language translation of the relevant portion of TW Office Action of R.O.C Patent Application 103119186, dated Jul. 7, 2015, Partial Translation, 16pp.

ISR—English translation of International Search Report for International Application No. PCT/JP2012/068866, dated Oct. 23, 2012.

EESR—Extended European Search Report of European Patent Application No. 12881577.6 dated Jul. 23, 2015.

TWOA—Office Action of Republic of China (Taiwan) Patent Application No. 102117718 dated Jul. 30, 2015,with partial English translation of the Office Action.

USOA—Non-Final Rejection of U.S. Appl. No. 14/603,718 dated Sep. 19, 2016.

CNOA—Office Action of Chinese Patent Application No. 2013800779743 dated Mar. 30, 2018, with partial English translation of the Office Action.

* cited by examiner

DATA NETWORK MANAGEMENT SYSTEM, DATA NETWORK MANAGEMENT APPARATUS, DATA PROCESSING APPARATUS, AND DATA NETWORK MANAGEMENT METHOD

CROSS REFERENCE TO RELATED APPLICATIONS

This application is a continuation application of International Application PCT/JP2013/068447, filed on Jul. 4, 2013 and designating the U.S., the entire contents of which are incorporated herein by reference.

FIELD

The embodiments discussed herein are related to a data network management system, a data network management apparatus, a data processing apparatus, and a data network management method that manage a data network.

BACKGROUND

A data network is conceivable where numerous sensors, for example, several hundred to several tens of thousands of low-cost chip sensors (data processing apparatuses) are installed in an installation area and each sensor wirelessly transmits detection related information, and a higher level parent device collects the detection related information. When implementing wide area coverage using numerous sensors, sensors have to be provided in an enormous number (nodes).

Further, sensors that operate using a harvester (e.g., energy conversion of light, vibration, temperature, wireless radio waves, etc. in the external environment of the installation site) as a power source, have extremely low processing performance. When a data network includes non-guaranteed sensors, the non-guaranteed sensors have to be removed from the system to guarantee the accuracy of data. However, each sensor is of an extremely small size and is difficult to visually identify and therefore, cannot be easily removed.

In a typical server client system, client authentication is performed using encryption that employs, for example, public keys and private keys, and written certification in which these are used. When a sensor performs processing to execute an authentication scheme, both the volume of data and the volume of processing create an extremely large processing load and therefore, with respect to simple sensors, there is a need for a reduced volume of data that is to be handled and authentication that can be performed easily.

According to a conventional technique, in a sensor network, sensors that perform detection according to a sensor attribute (temperature, humidity, position, etc.) are identified from among plural sensors (for example, refer to Japanese Laid-Open Patent Publication No. 2008-176502). According to another technique, nodes are identified using ID information that is transmitted from a system to the nodes to control the power source of each node (for example, refer to Japanese Laid-Open Patent Publication No. 2010-141469).

With the conventional techniques above, no measure to guarantee of the accuracy of the data output by the sensors is performed. For example, whether the large number of installed sensors performed a proper operation test is not confirmed. In this case, if sensors that have not performed a given authentication test (operation test), such as sensors of an unauthorized manufacturer, are installed in the installation area, the accuracy of the data collected from the sensor information decreases.

Further, sensor reliability such as data accuracy, durability, etc. may vary according to manufacturer. Therefore, after sensor installation, the operation state of the sensor during actual operation cannot be determined and assessment of the sensors cannot be performed. Additionally, when sensors of multiple manufacturers are installed in an installation area, no process can be implemented for managing assessment according to manufacturer and managing distribution of utilization costs for sensor operation according to manufacturer, based on the assessment results.

SUMMARY

According to an aspect of an embodiment, a data network management system includes a data network management apparatus; and plural data processing apparatuses installed in an installation area and configured to transmit data to the data network management apparatus. The plural data processing apparatuses transmit identification information thereof together with the processed data to the data network management apparatus. The data network management apparatus determines based on identification information of data processing apparatuses that have completed a given authentication test among the plural data processing apparatuses and the identification information obtained from the plural data processing apparatuses installed in the installation area, a first data processing apparatus from which the data is to be obtained among the plural data processing apparatuses.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1:
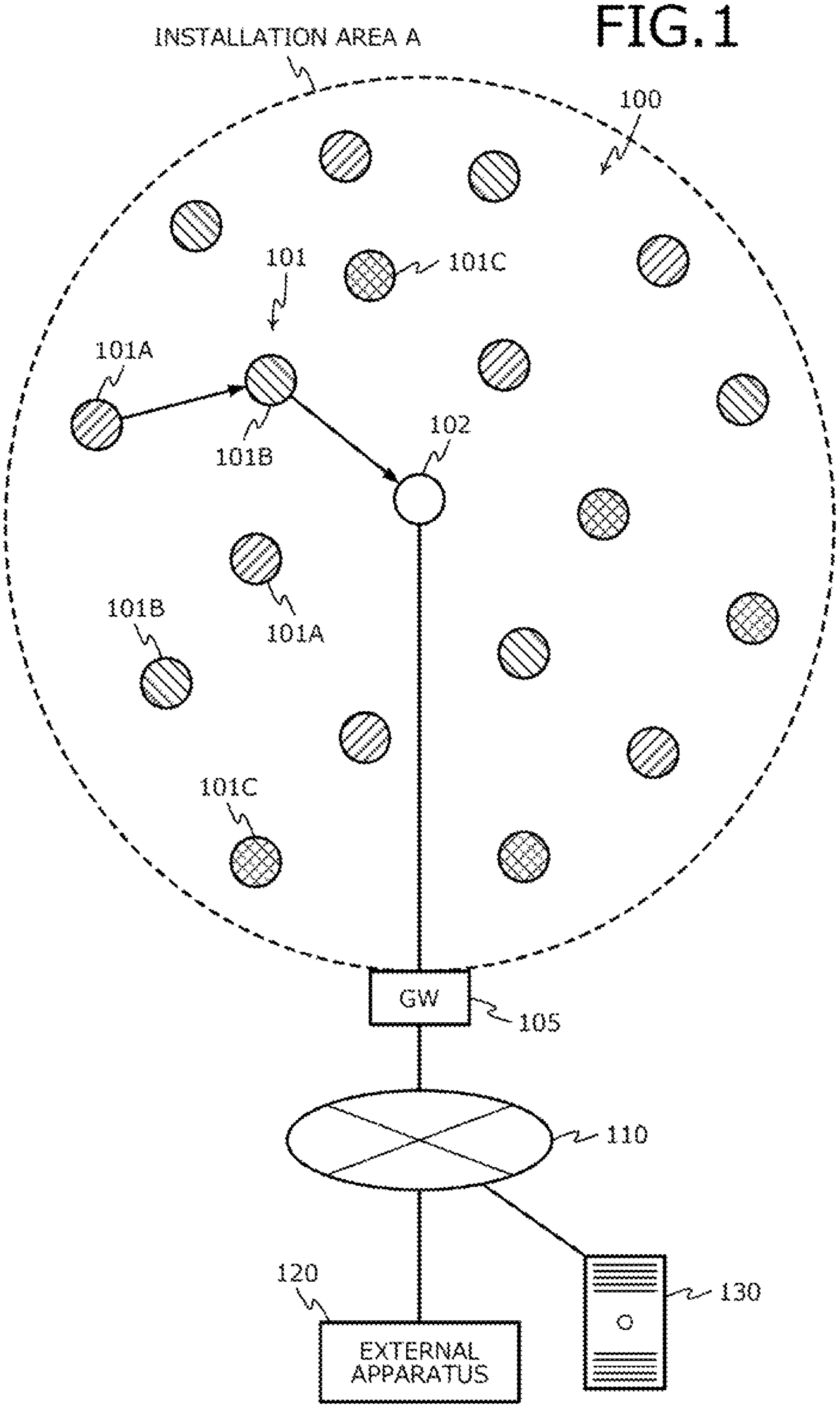
FIG. 1 is a diagram depicting an installation state of sensors installed in a data network according to an embodiment.

Embodiments of the present disclosure will be described in detail with reference to the accompanying drawings. FIG. 1 is a diagram depicting an installation state of sensors installed in a data network according to an embodiment. As depicted in FIG. 1, in a given installation area A, plural sensor nodes (data processing apparatuses) 101 of numerous chips are installed.

Further, as depicted in FIG. 1, sensor nodes 101A, 101B, 101C that are manufactured by different makers (manufacturers) are installed in the installation area A. A parent node (data aggregating apparatus, aggregator) 102 that, for example, wirelessly receives sensor output of the plural sensor nodes 101 is also installed in the installation area A.

The sensor nodes 101 detect given changes at the installation sites in the installation area A and transmit by wireless communication to the parent node 102, detection related information (sensing data). For example, the sensor nodes 101 periodically transmit sensing data at a constant time interval. The parent node 102 aggregates the sensing data obtained by the plural sensor nodes 101 installed in the installation area A and for example, uploads information to a server as an external apparatus 120, gives notification of sensing data obtained by the sensor nodes 101 to a user terminal as the external apparatus 120, etc.

The sensor nodes 101, as depicted in FIG. 1, are installed in a large volume in the installation area A. Further, installation of the parent node 102 is not limited to installation of a single node in the installation area A and alternatively, plural nodes may be installed along an outer perimeter (e.g., 4 positions located at each corner of the installation area A when having a rectangular shape as viewed as a plane) of the installation area A. The sensor nodes 101 in the embodiment suffice to have short-distance distance wireless communication capability enabling output of wireless radio waves capable of reaching at least nearby sensor nodes 101. Therefore, data of the sensor node 101A, which is far from the parent node 102, is transferred to the parent node 102 via another one or plural sensor nodes 101B. By such transfer of a given hop count, sensing data obtained by the sensor nodes 101 reaches the parent node 102 (refer to arrow in FIG. 1).

The parent node 102 transmits to the external apparatus 120 (e.g., a server) via a gateway (GW) 105 and a network 110, information transmitted by the sensor nodes 101. The parent node 102 may have a configuration that with respect to one or more of the plural sensor nodes 101, uses an entity having a function of connecting to the network 110.

The GW 105, without limitation to the single the installation area A depicted in FIG. 1, is connected to other sensor nodes 101 of plural installation areas A, B, C, . . . and, sorts and processes installation area specific data. Further, the GW 105 may have a function of the parent node 102 and in this case, the parent node 102 can be omitted. Based on the information transmitted from the sensor nodes 101, the external apparatus 120 performs information processing such as maintaining statics of sensor output in the installation area A.

The network 110 is connected to a data network management apparatus 130 that manages the sensor nodes 101. The data network management apparatus 130 may use the external apparatus 120 server above.

Figure 2:
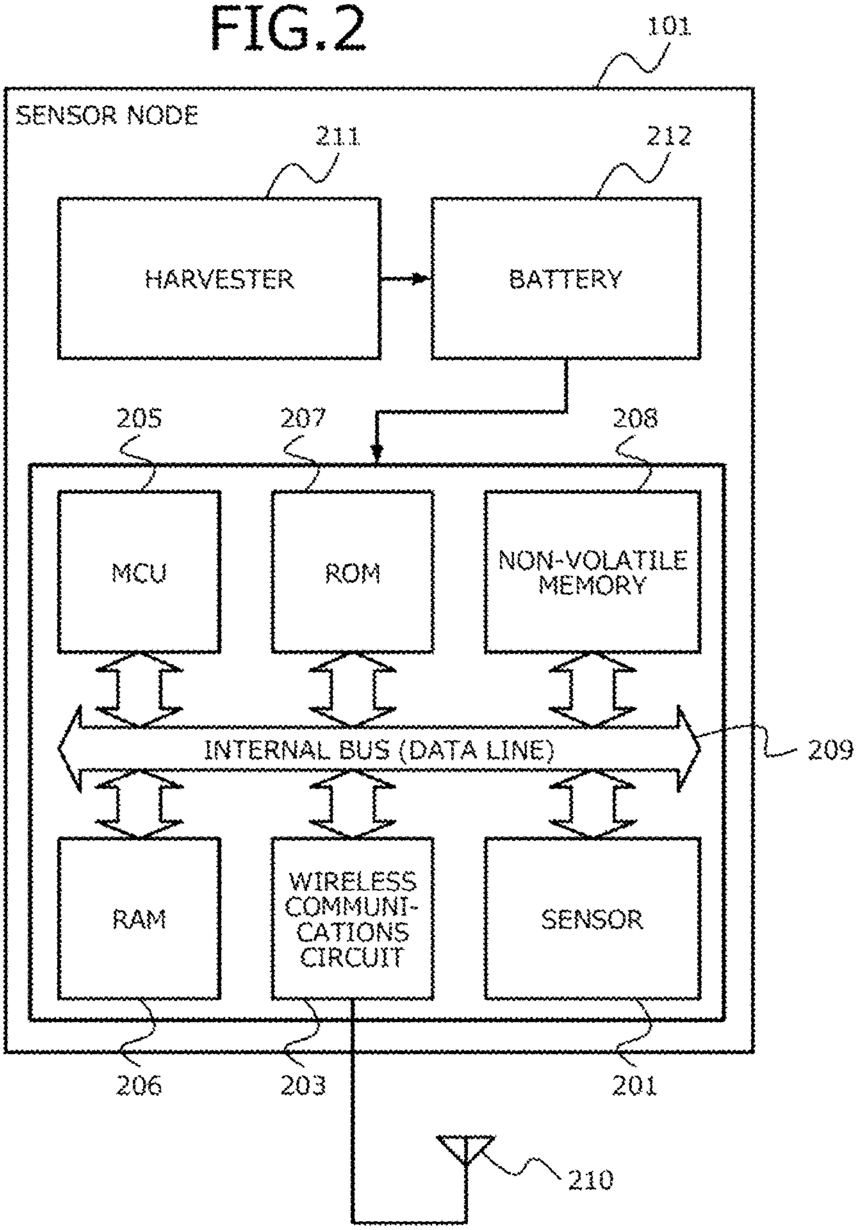
FIG. 2 is a block diagram depicting an example of internal configuration of a sensor node.

FIG. 2 is a block diagram depicting an example of internal configuration of the sensor node. The sensor node 101, which is a data processing apparatus, includes a sensor 201, a wireless communications circuit 203, a micro control unit (MCU) 205, random access memory (RAM) 206, read-only memory (ROM) 207 retaining data written thereto in advance, non-volatile memory (storage unit) 208 retaining rewritable data, an antenna 210, a harvester 211, and a battery 212.

The sensor 201 detects a given change at the installation site and outputs sensing data. The sensor 201, for example, may be a piezoelectric element that detects voltage at the installation site, a photoelectric element that detects light, and the like. The sensor 201 is not limited to a single type and plural sensors 201 can be installed and output plural types of sensing data. The antenna 210 transmits and receives radio waves wirelessly communicated with the parent node 102. A wireless communications circuit (RF) 203 outputs a received wireless radio wave as a reception signal and transmits a transmission signal as a wireless radio wave, via the antenna 210.

The MCU 205 processes sensing data obtained by the sensor 201. The RAM 206 stores transient data of the processing at the MCU 205. The ROM 207 stores processing programs executed by the MCU 205. The non-volatile memory 208 retains given data written thereto, even when the power supply ceases. Further, components including the sensor 201 to the non-volatile memory 208 are connected via an internal bus 209.

The sensor node 101 further includes the harvester 211 and the battery 212. The harvester 211 generates power based on the external environment at the installation site of the sensor node 101 thereof, such as, for example, energy changes in light, vibration, temperature, wireless radio waves (reception radio waves), etc. The battery 212 stores and supplies the power generated by the harvester 211, as a driving power source of the components of the sensor node 101. In other words, the sensor node 101 does not require a secondary battery or external power source and internally generates power for operation.

Figure 3:
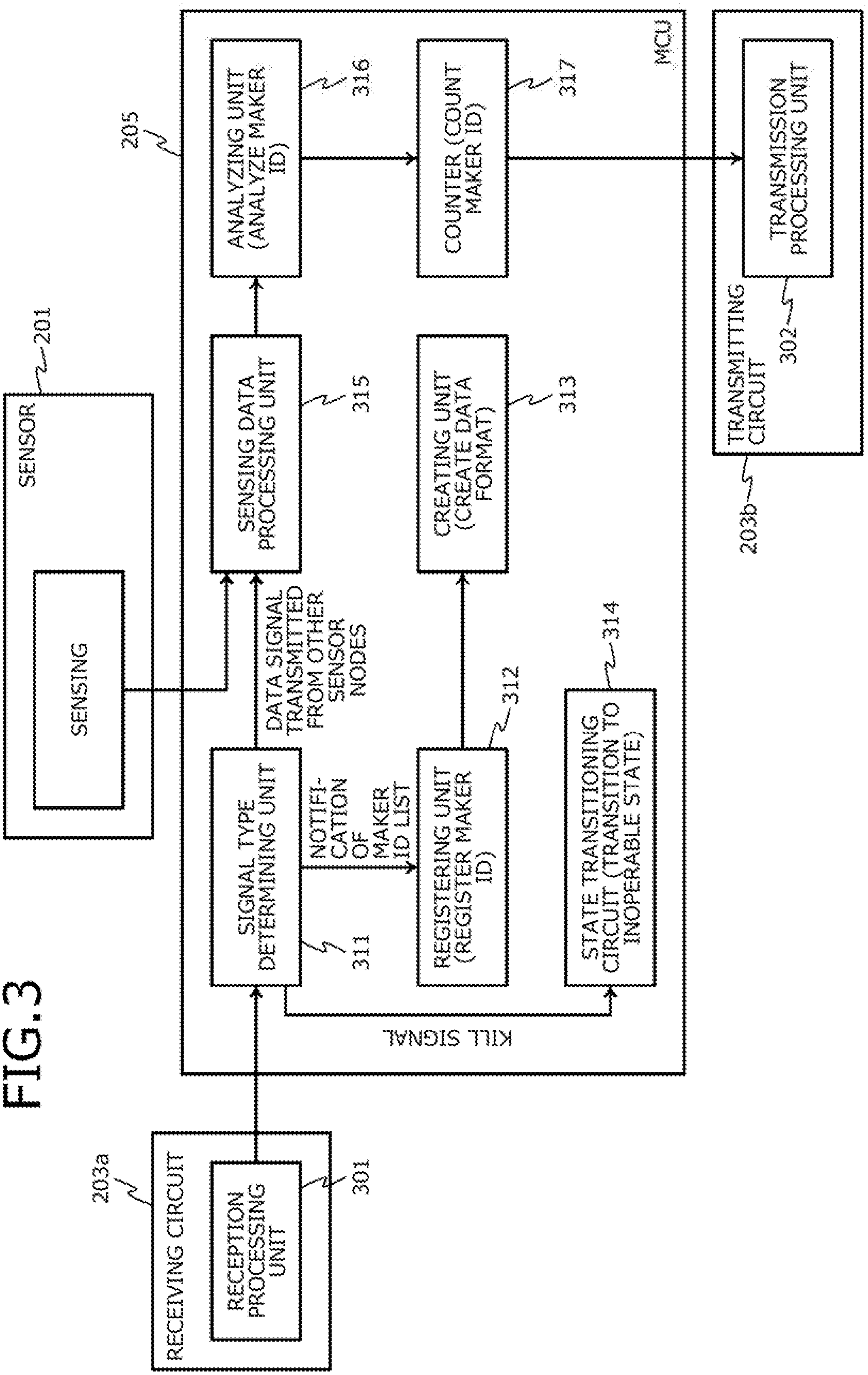
FIG. 3 is a block diagram depicting functions of the sensor node.

FIG. 3 is a block diagram depicting functions of the sensor node. The MCU 205 of the sensor node 101 has the functional units depicted in FIG. 3. A reception circuit 203*a* (the wireless communications circuit 203 in FIG. 2) has a reception processing unit 301 that receives data transmitted from other sensor nodes 101 and the data network management apparatus 130. A transmission circuit 203*b* (the wireless communications circuit 203 in FIG. 2) has a transmission processing unit 302 that with respect to other sensor nodes 101, transmits sensing data of the sensor 201 of the sensor node 101 thereof, and transmits (transfers) sensing data transmitted from other sensor nodes 101 to yet other sensor nodes 101.

The MCU 205 includes functions of a signal type determining unit 311, a registering unit 312, a creating unit 313, a state transitioning circuit 314, a sensing data processing unit 315, an analyzing unit 316, and a counter 317.

The signal type determining unit 311 analyzes data transmitted from other sensor nodes 101 and the data network management apparatus 130 and determines signal type. For example, the signal type determining unit 311 receives data from other sensor nodes 101, and receives from the data network management apparatus 130, data concerning control information (e.g., function kill (kill signal), etc.) for the sensor nodes 101, a maker ID list as identification information of the sensor nodes 101, etc.

The signal type determining unit 311 determines signal type based on the command ID at the head of these data (data packets). The registering unit 312 registers the maker ID in response to notification of the manufacturer (maker) ID list from the data network management apparatus 130. The creating unit 313 creates a data format according to the maker ID registered by the registering unit 312. The sensor node 101 uses the created data format to transmit data and the maker ID.

The state transitioning circuit 314 transitions the operation state of the sensor node 101, based on the signal type determined by the signal type determining unit 311. When function kill (kill signal described hereinafter) is received for a specified sensor node 101 from the data network management apparatus 130, the sensor node 101 performs processing causing function kill (transition to an inoperable state).

The sensing data processing unit 315 performs data processing that corresponds to the type of data related to sensing by the sensor 201. The processed data of the sensing data processing unit 315 is transmitted to other sensor nodes 101 from the transmission processing unit 302, via the analyzing unit 316 and the counter 317. Here, at the analyzing unit 316, whether the maker ID of the sensor node 101 thereof is included in the maker ID list notified by the data network management apparatus 130 is determined. The maker ID of the sensor node 101 is stored to the non-volatile memory 208, etc. of the sensor node 101 in advance and is read out by the analyzing unit 316.

If the maker ID of the sensor node 101 thereof is included in the maker ID list, the counter 317 increments in transmission data, a counter that corresponds to the maker ID of the sensor node 101.

Figure 4:
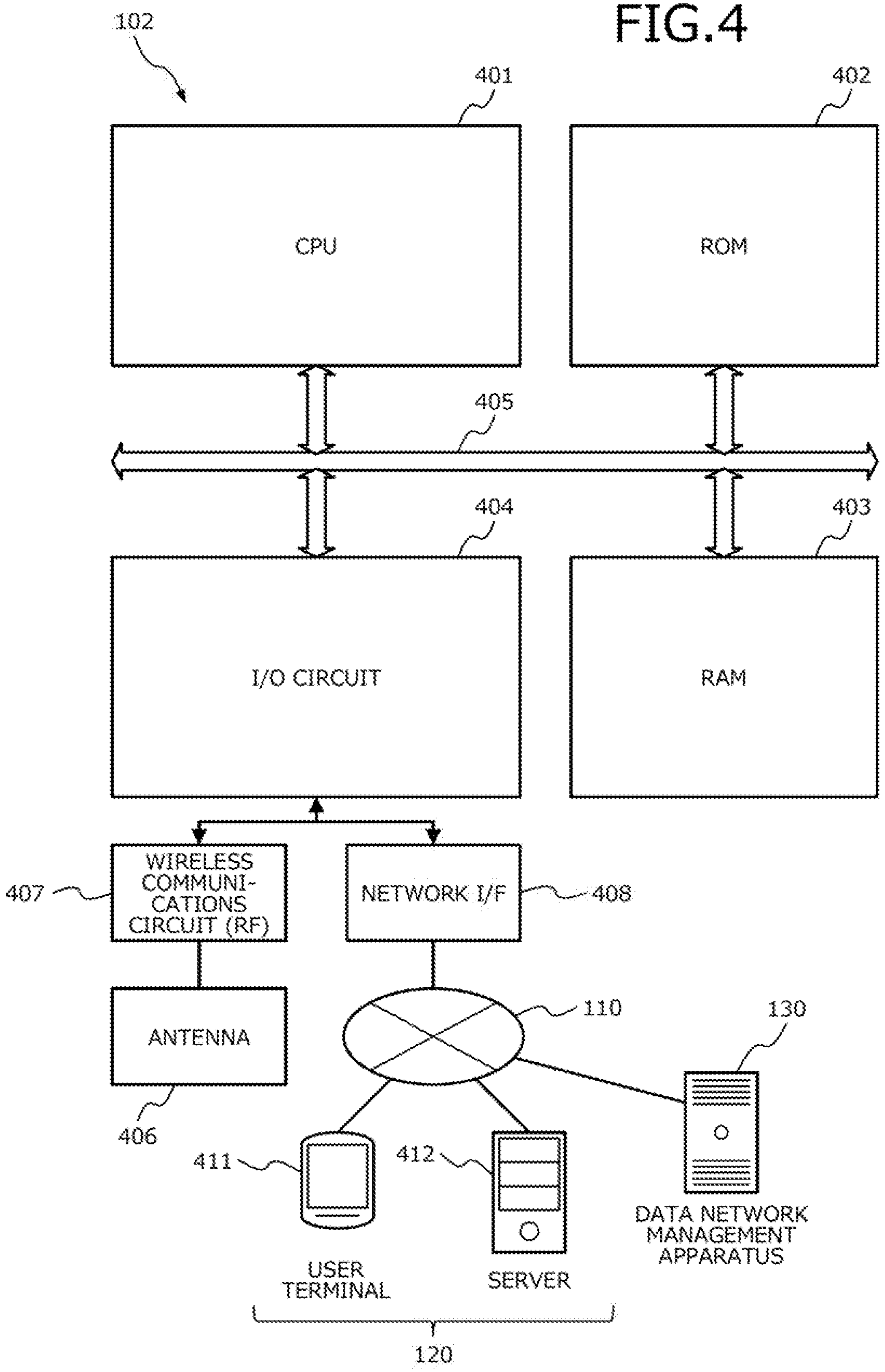
FIG. 4 is a block diagram depicting an example of an internal configuration of a parent node.

FIG. 4 is a block diagram depicting an example of an internal configuration of the parent node. The parent node 102 has a function of aggregating sensing information transmitted from the plural sensor nodes 101. The parent node 102, unlike the sensor node 101, has no sensor and operates by an external power source. The parent node 102 includes a processor (CPU) 401 that is more sophisticated than the processor (MCU) 205 of the sensor node 101, large-capacity ROM 402 and RAM 403, an interface (I/O) circuit 404, and a bus 405 connecting the respective components including the CPU 401 to the I/O circuit 404.

The I/O circuit 404 is connected to an antenna 406 and a wireless communications circuit (radio frequency (RF)) 407 for wireless communication with the sensor nodes 101, and to a network I/F 408 through which the parent node 102 aggregates sensing information transmitted from the plural sensor nodes 101. The aggregated information is transmitted via the network I/F 408 by a TCP/IP protocol process, and via the network 110, such as the Internet, to a user terminal 411, a server 412, etc. that is the external apparatus 120.

The user terminal 411 and the server 412 receive the aggregated sensing information and perform data processing such as statistical processing. Further, the data network management apparatus 130 connected via the network 110 is configured by a server, etc. and manages the sensor nodes 101. The server 412 for data processing and the server functioning as the data network management apparatus 130 may be independent apparatuses or may be configured using a single apparatus.

Figure 5:
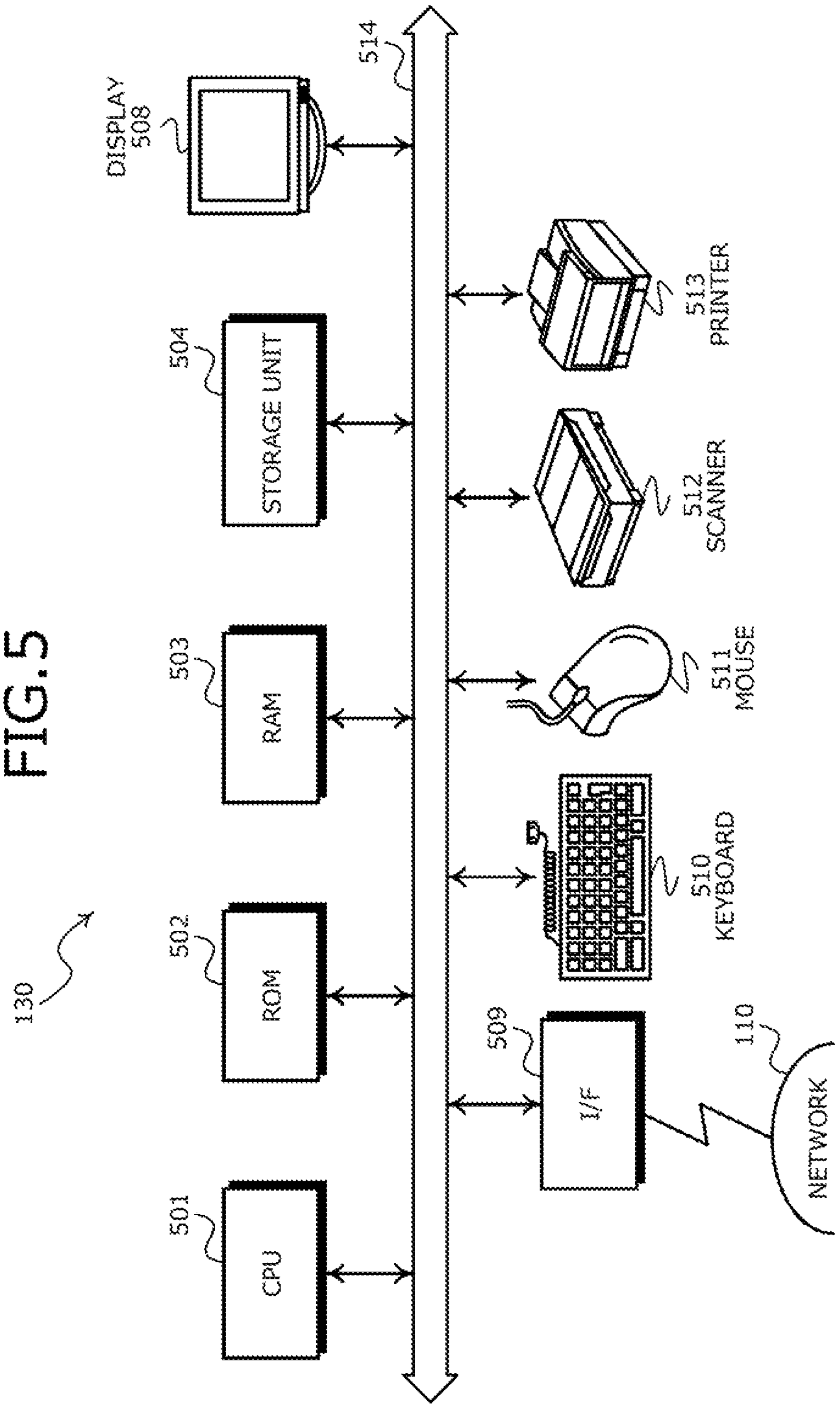
FIG. 5 is a block diagram depicting an example of hardware configuration of a data network management apparatus.

FIG. 5 is a block diagram depicting an example of hardware configuration of the data network management apparatus. In FIG. 5, the data network management apparatus 130 includes a control unit (CPU) 501, ROM 502, and RAM 503 and may have a storage unit 504 such as semiconductor memory and a disk drive, a display 508, a communications interface (I/F) 509, a keyboard 510, a mouse 511, a scanner 512, and a printer 513. The components including the CPU 501 to printer 513 are respectively connected by a bus 514.

The CPU 501 is a computation processing apparatus that governs overall control of the data network management apparatus 130. The ROM 502 is non-volatile memory storing therein management programs of the data network management apparatus 130. The RAM 503 is volatile memory used as a work area during execution of computation processing by the CPU 501.

The communications interface 509 administers an internal interface with the network 110 and controls the input and output of data from external apparatuses. More specifically, the communications interface 509 is connected through a communications line, to the network 110, which is a local area network (LAN), a wide area network (WAN), the Internet, etc., and is connected to other apparatuses (the GW 105 and the sensor nodes 101) via the network 110. A modem or LAN adapter may be employed as the communications interface 509, for example.

The display 508 is an apparatus that displays data such as documents, images, and functional information, in addition to a cursor, icons, and toolboxes concerning setting screens and verification results for data network management processing. A thin film transistor (TFT) liquid crystal display, a plasma display, an organic EL display, and the like may be employed as the display 508, for example.

The CPU 501 depicted in FIG. 5 executes a data network management program stored in the ROM 502, whereby authentication and operation control of the sensor nodes 101 installed in the installation area A, and various management processes are performed such as distribution of utilization cost corresponding to makers of authenticated proper sensor nodes 101, etc.

An example of sensor node management processing using the data network management apparatus 130 will be described. First, management processing during construction for the sensor nodes 101, i.e., management processing occurring after the sensor nodes 101 are installed in the installation area A until operation commences will be described.

Figure 6:
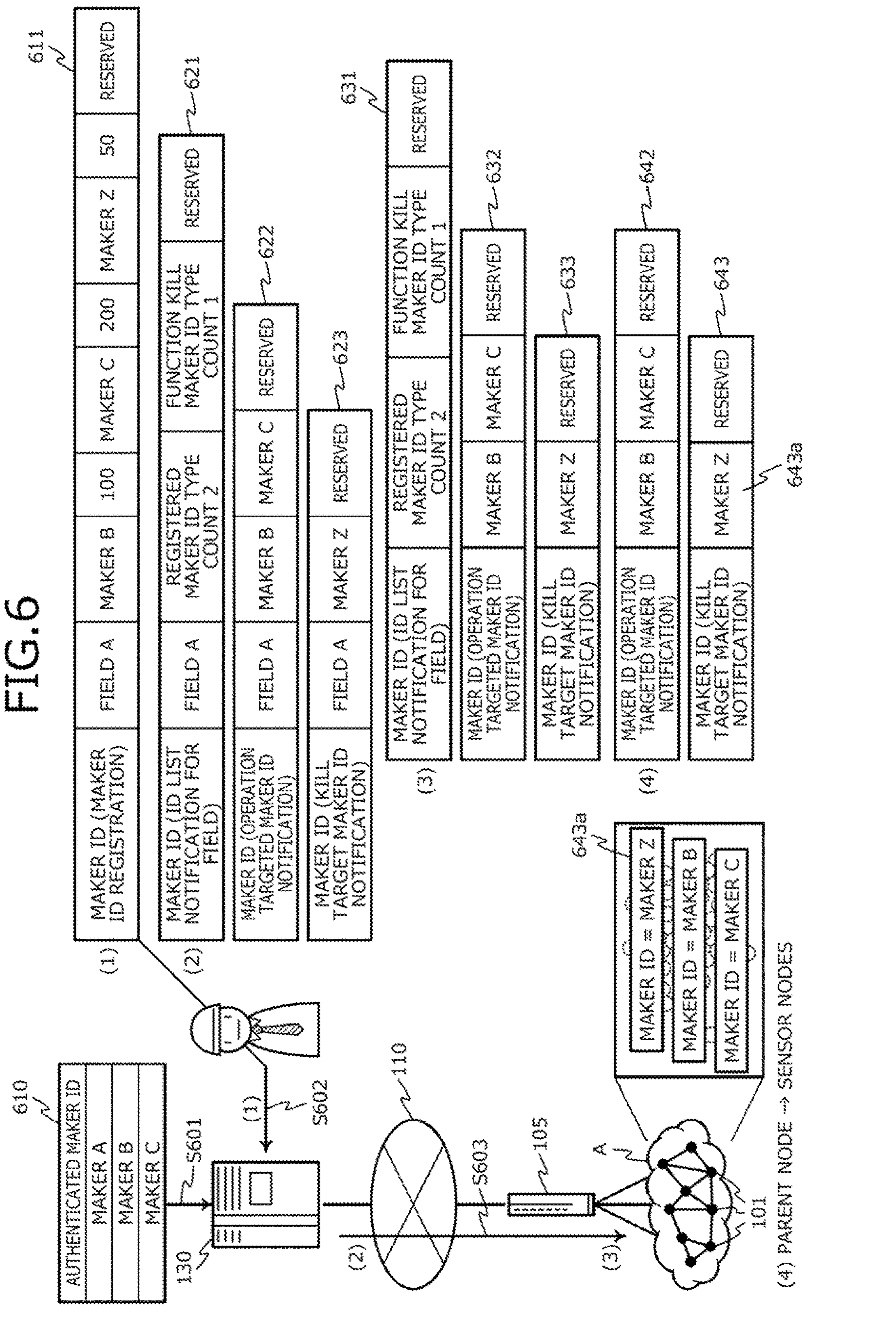
FIG. 6 is a diagram describing details of management processing during construction.

FIG. 6 is a diagram describing details of management processing during construction. FIG. 6 depicts an example of data packets and an overall structure of a data network that includes, for example, the data network management apparatus 130 and the sensor nodes 101 depicted in FIG. 1.

Information (authentication information) 610 related to authenticated sensor nodes 101 that have cleared a given operation test (compatibility test of each maker, etc.) by a certification authority is preregistered into a database in the data network management apparatus 130 (step S601). The authentication information 610 corresponds to the information of the sensor nodes 101 permitted to be installed in the data network (the installation area A). The database is provided in the storage unit 504, etc.

An authenticated sensor node 101 is that for which durability, sensing precision and, data processing and communication performance, etc. satisfy given standards. In the depicted example, manufacturer (maker) IDs (makers A, B, C) of authenticated sensor nodes 101 are registered as the authentication information 610.

(1) Thereafter, the sensor nodes 101 are installed in the installation area A, and the builder, etc. registers information (installation information 611) of the installed sensor nodes 101 to the data network management apparatus 130 by command input (step S602). Here, installation counts for each maker ID are registered as the installation information 611. In the depicted example, "registration of maker ID" is set for a command ID of registration, and makers (100 units by maker B, 200 units by maker C, and 50 units by maker Z) corresponding to the installation area A (field A) are registered.

(2) The data network management apparatus 130 performs authentication processing for the installed sensor nodes 101. For example, only the sensor nodes 101 having maker IDs that have been authentication tested are authenticated and permitted, whereas the sensor nodes 101 having non-authenticated maker IDs that have not cleared an authentication test are not authenticated or permitted. Authenticated maker IDs that have been registered as the authentication information 610 include makers A, B, and C whereas, the maker IDs of the installation information 611 include makers B, C, and Z.

Therefore, the data network management apparatus 130 detects maker Z as a non-authenticated maker and does not authenticate or permit maker Z. The data network management apparatus 130 respectively sets, for the command ID of packets to be transmitted to the sensor nodes 101 of the installation area A, ID list notification 621, operation targeted maker ID notification 622, function kill (kill target) maker ID notification 623, respectively for the installation area A (field A).

A packet of the ID list notification 621 is formed by information of all the sensor nodes 101 in the installation area, based on the authentication information 610 and the installation information 611. Items of the ID list notification 621 include the installation area A (field A), a type count of registered maker IDs (corresponds to a type count of 2 for makers B and C), and a type count of maker IDs subject to function kill (kill targets) (corresponds to a type count of 1 for maker Z).

A packet of the operation targeted maker ID notification 622 is formed by information of the sensor nodes 101 that have been authenticated and are permitted (permitted to operate) in the installation area A, based on the authentication information 610 and the installation information 611. Items of the operation targeted maker ID notification 622 include the installation area A (field A) and operation permitted maker IDs (makers B and C).

A packet of the function kill (kill target) maker ID notification 623 is formed by information of the sensor nodes 101 that have not been authenticated and are not permitted to operate (subject to function kill) in the installation area A, based on the authentication information 610 and the installation information 611. Items of the function kill (kill target) maker ID notification 623 include the installation area A (field A) and maker IDs (maker Z) to be subject to function kill.

The data network management apparatus 130 transmits the packets of the ID list notification 621, the operation targeted maker ID notification 622, and the function kill (kill target) maker ID notification 623, to the corresponding sensor nodes 101 in the installation area A (step S603).

(3) The GW 105 provided between the data network management apparatus 130 and the sensor nodes 101 receives the respective packets of the ID list notification 621, the operation targeted maker ID notification 622, and the function kill (kill target) maker ID notification 623. The GW 105 transmits to the sensor nodes 101 in the installation area A, respective packets of ID list notification 631, operation targeted maker ID notification 632, and function kill (kill target) maker ID notification 633. Here, the GW 105 can manage and identify the sensor nodes 101 of the installation area A and therefore, deletes the information related to the installation area A from the respective packets of the ID list notification 621, the operation targeted maker ID notification 622, and the function kill (kill target) maker ID notification 623, and transfers the packets.

(4) The parent node 102 in the installation area A transfers as is to the sensors node 101, the respective packets of the operation targeted maker ID notification 632 and the function kill (kill target) maker ID notification 633 received from the GW 105. Respective packets of operation targeted maker ID notification 642 and function kill (kill target) maker ID notification 643 are transmitted to the sensor nodes 101.

Each sensor node 101 stores the ID list notification 631 received from the data network management apparatus 130.

Further, the state transitioning circuit 314 of the sensor node 101 determines that if the maker thereof is a maker (maker ID=B, C) specified by the packet of the operation targeted maker ID notification 642, the sensor node 101 thereof is authenticated, permitted, and operable.

On the other hand, the state transitioning circuit 314 of the sensor node 101 determines that if the maker thereof is set in the packet of the function kill (kill target) maker ID notification 643, for which authentication is not permitted (maker ID=Z) 643*a*, the sensor node 101 thereof is not authenticated or permitted and subject to function kill. The state transitioning circuit 314 of the sensor node 101 for which the maker has not been authenticated or permitted, sets functions of the sensor node 101 to be in an inoperable state (function kill).

Management processing when after the construction for the sensor nodes 101, the sensor nodes 101 installed in the installation area A are operated and data is collected will be described.

In the description herein, a configuration in which the data network management apparatus 130 performs data network management and has a function of performing data processing and the data aggregation performed by the external apparatus 120 (the server 412) depicted in FIG. 4 will be described as an example. Further, description will be given using an example where in the installation area A, the plural sensor nodes 101 are uniformly distributed irrespective of maker, and the parent node 102 is installed in plural (e.g., installed at 4 positions located at corners of the installation area A assumed to have a rectangular shape as viewed as a plane).

Figure 7:
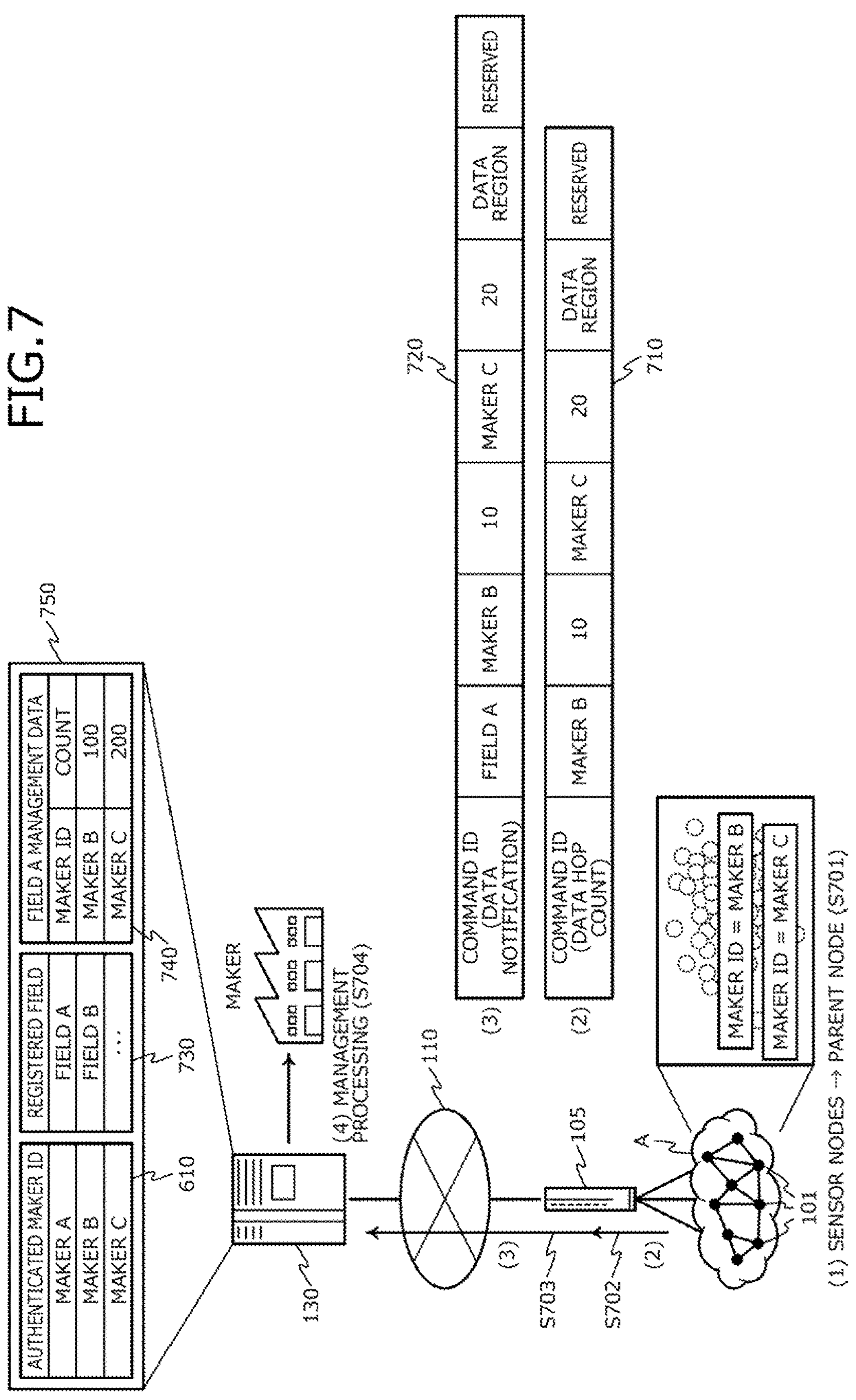
FIG. 7 is a diagram depicting details of the management processing during operation.

FIG. 7 is a diagram depicting details of the management processing during operation. The sensor nodes 101 of makers (makers B and C) authenticated during construction and permitted detect a given change via the sensors 201 and transmit data to an external destination.

(1) Each sensor node 101, upon receiving sensing data related to detection by the sensor 201 thereof and receiving sensing data of other sensor nodes 101, transmits the data to other sensor nodes 101. Here, the sensor node 101 uses the counter 317 to increment a count value each time data of a sensor node 101 corresponding to the maker ID of the sensor node 101 thereof is transmitted (step S701). Here, the sensor node 101 creates, by the creating unit 313, a data format of a data packet 710 to be transmitted to the data network management apparatus 130.

(2) The parent nodes 102 perform synchronous processing of the data aggregated from the sensor nodes 101. Here, the parent nodes 102 calculate the average of the counter values for each maker ID for which data is counted by the counters 317 of the sensor nodes 101. In the present example, since the parent nodes 102 are provided at 4 positions, for each maker ID, the counts of the data included in the collected data are divided by 4. The parent nodes 102 set "data hop count" as the command ID of the data packets 710 destined for the data network management apparatus 130 and transmit the data packets 710 (step S702). In the depicted example, the data packet 710 includes the average count for maker B: 10, the average count for maker C: 20, and data related to the detection by the sensors 201.

(3) The GW 105 transmits to the data network management apparatus 130, data packets 720, which are the data packets 710 transmitted from the parent nodes 102 and to which a field for the installation area A (field A) is appended (step S703).

(4) The data network management apparatus 130 receives the data packets 720, extracts the data of the data region, performs given data processing, and performs analysis of the data related to detection by the sensors 201 in the installation area A.

In addition to the authentication information 610, the data network management apparatus 130 retains in the database as management data 750 for data network management, registered installation area (field) information 730 and installation area specific installation area management data 740. The registered installation area information 730 is information concerning the installation areas A, B managed by the data network management apparatus 130. The installation area management data 740 includes maker IDs of the sensor nodes 101 in the installation area (in the present example, the installation area A) and installation counts (information concerning authenticated makers B, C of the installation information 611 depicted in FIG. 6).

The data network management apparatus 130 performs data network management processing (step S704) by given data processing that is based on the management data 750 and transmission data from the sensor nodes 101. Here, as an example of data network management processing, operation counts of the sensor nodes corresponding to the maker IDs can be calculated. Although described hereinafter, based on the calculated operation counts, distribution of utilization cost for each maker can also be determined.

For example, as depicted, in the installation area management data 740, the installation count for each maker is assumed to be x(100) units for maker B and y(200) units for maker C. Further, based on the contents of the data packets 720 transmitted from the sensor nodes 101, the count values (hop count) for the respective makers are assumed to be a(10) hops for maker B and b(20) hops for maker C. The data network management apparatus 130 calculates based on these data, a count of the sensor nodes 101 that operated in the installation area A.

In the example above, the operation count for the sensor nodes 101 of maker B can be calculated by computation of operation count=(x+y)×a/(a+b) and as a calculation result, a result indicating the all (100 units) the sensor nodes 101 of maker B are operating can be obtained. Operation counts for other makers as well can be obtained by the same computation. When the sensor nodes 101 are uniformly distributed in the installation area A, the number of sensor nodes in operation is proportionate to the hop count.

Figure 8:
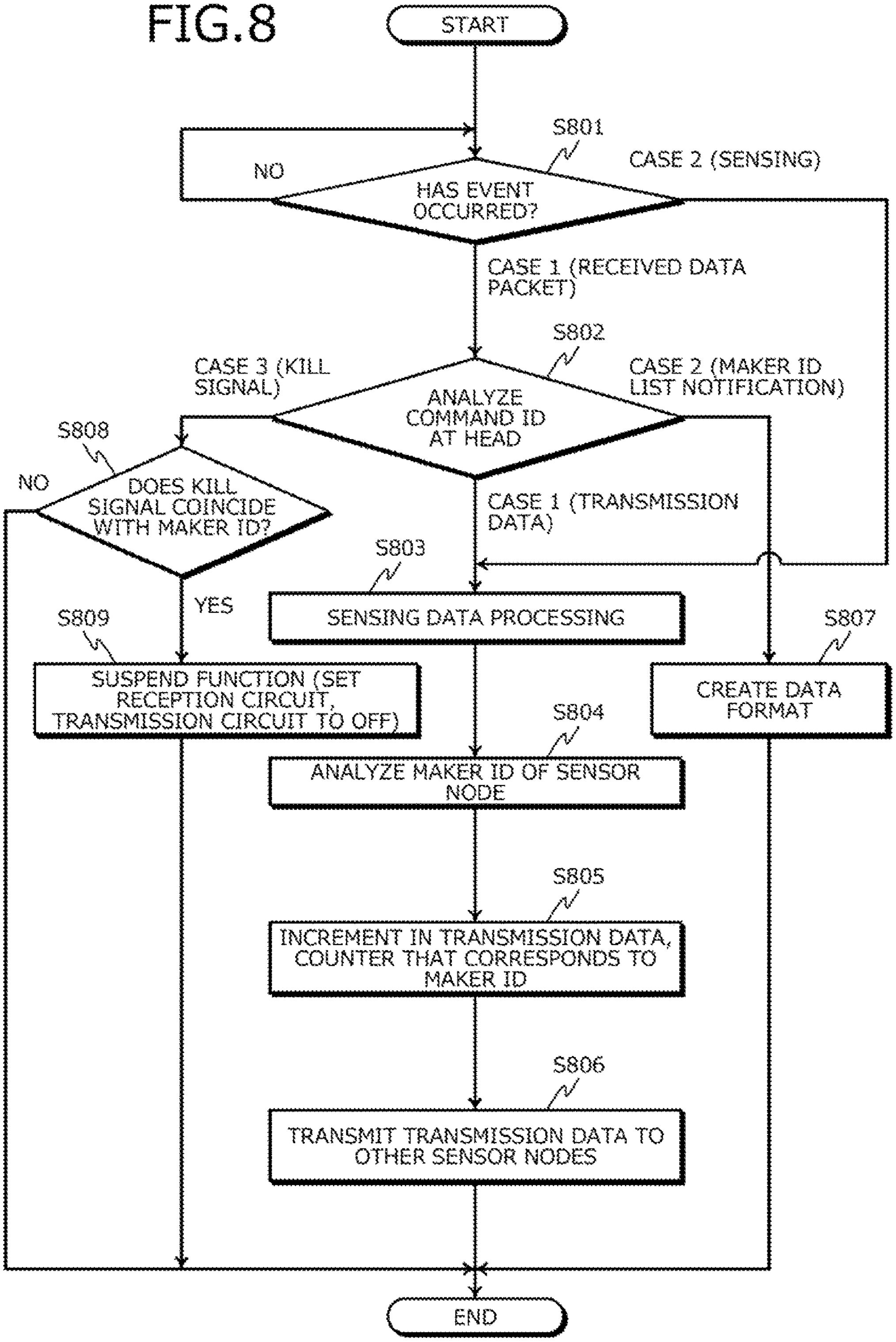
FIG. 8 is a flowchart depicting details of processing performed by the sensor node.

FIG. 8 is a flowchart depicting details of processing performed by the sensor nodes. Processing performed by the MCUs 205 of the sensor nodes 101 during the above construction and operation will be described. First, each MCU 205 waits for an event to occur (step S801: NO). When an event of receiving a data packet occurs (step S801: Case 1), the MCU 205 transitions to step S802, and if the event is sensing (step S801: Case 2), the MCU 205 transitions to step S803.

At step S802, the MCU 205 analyzes the command ID at the head of the received data packet (step S802). When the command ID of the packet head is transmission data of another sensor node 101 (step S802: Case 1), the MCU 205 transitions to step S803. When the command ID of the packet head is the maker ID list transmitted by the data network management apparatus 130 (step S802: Case 2), the MCU 205 transitions to step S807. When the command ID of the packet head is function kill (kill signal) transmitted by the data network management apparatus 130 (step S802: Case 3), the MCU 205 transitions to step S808.

At step S803, the MCU 205, via the sensing data processing unit 315, performs data processing suitable for the data (sensing data) transmitted from the other sensor node 101 (step S803). The sensing data processing unit 315 further performs data processing suitable for sensing data related to detection by the sensor 201 of the node thereof.

Further, the MCU 205, via the analyzing unit 316, analyzes the maker ID of the sensor node 101 thereof (step S804), and by the counter 317, increments in the transmission data, the counter that corresponds to the maker ID thereof (step S805). The MCU 205, via the transmission processing unit 302, outputs a packet that includes the count value for each maker ID and data (sensing data), as transmission data, to an external destination (transmits to other sensor nodes 101) (step S806), and ends the processing for one event.

At step S807, the MCU 205, via the creating unit 313, creates a data format that is based on the maker ID list received from the data network management apparatus 130 (step S807), and ends the processing. The data format is a format having the items of the data packet 710 (refer to FIG. 7) during operation. In the fields of the format for the data packet 710, sensing data processing from step S803 is performed and data that is to be transmitted is stored.

At step S808, the MCU 205, via the state transitioning circuit 314, determines whether the function kill (kill signal) received from the data network management apparatus 130 coincides with the maker ID thereof (step S808). If the function kill (kill signal) coincides (step S808: YES), the MCU 205, via the reception circuit 203*a*, function kills the sensor node 101 thereof by setting the transmission circuit 203*b* to OFF, etc. (step S809), and ends the processing for one event. If the function kill (kill signal) does not coincide (step S808: NO), the MCU 205 ends the processing.

Figure 9:
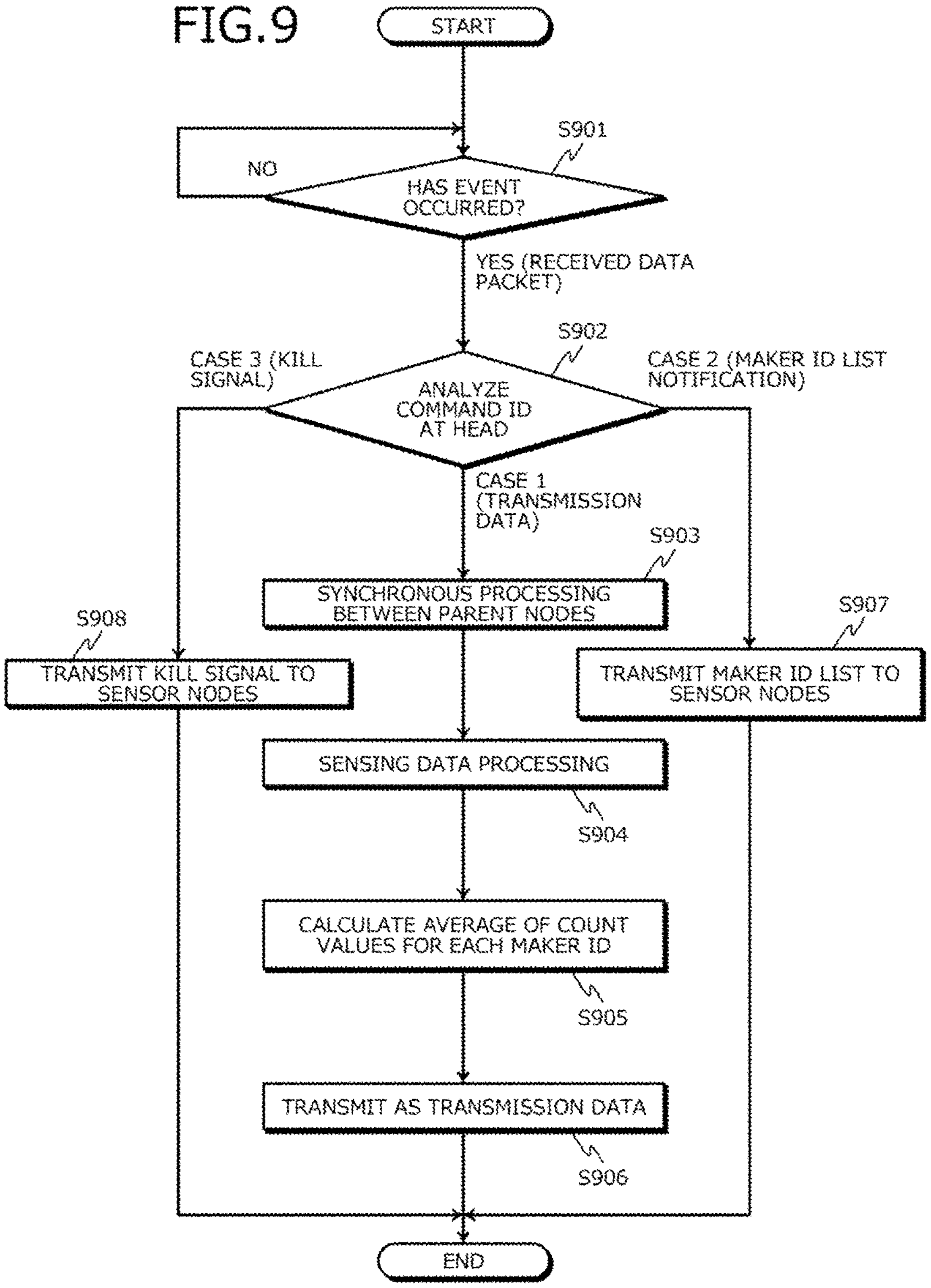
FIG. 9 is a flowchart depicting details of processing performed by the parent node.

FIG. 9 is a flowchart depicting details of processing performed by the parent nodes. Processing performed by the CPUs 401 of the parent nodes 102 during the above construction and operation will be described. In cases where functions of the parent node 102 are executed by the GW 105, the GW 105 performs the processing below.

First, each CPU 401 waits for an event to occur (step S901: NO). When an event of receiving a data packet occurs (step S901: YES), the CPU 401 analyzes the command ID at the head of the received data packet (step S902).

When the command ID of the packet head is transmission data of another sensor node 101 (step S902: Case 1), the CPU 401 transitions to step S903. When the command ID of the packet head is the maker ID list transmitted by the data network management apparatus 130 (step S902: Case 2), the CPU 401 transitions to step S907. When the command ID of the packet head is a maker ID notification signal for function kill (kill signal) transmitted by the data network management apparatus 130 (step S902: Case 3), the CPU 401 transitions to step S908.

At step S903, the CPU 401 performs synchronous processing between the parent nodes 102 (step S903) and via the sensing data processing unit 315, performs data processing suitable for the received data (sensing data) (step S904). Further, the CPU 401 calculates the average of the count values for each maker ID (step S905). The CPU 401 transmits, as transmission data, to the data network management apparatus 130, a packet that includes the average count value for each maker ID and data (sensing data) (step S906), and ends the processing for one event.

At step S907, the CPU 401 transmits to the sensor nodes 101, the maker ID list received from the data network management apparatus 130 (step S907), and ends the processing. At step S908, the CPU 401 transmits to the sensor nodes 101, the function kill (kill signal) received from data network management apparatus 130 (step S908), and ends the processing.

Figure 10:
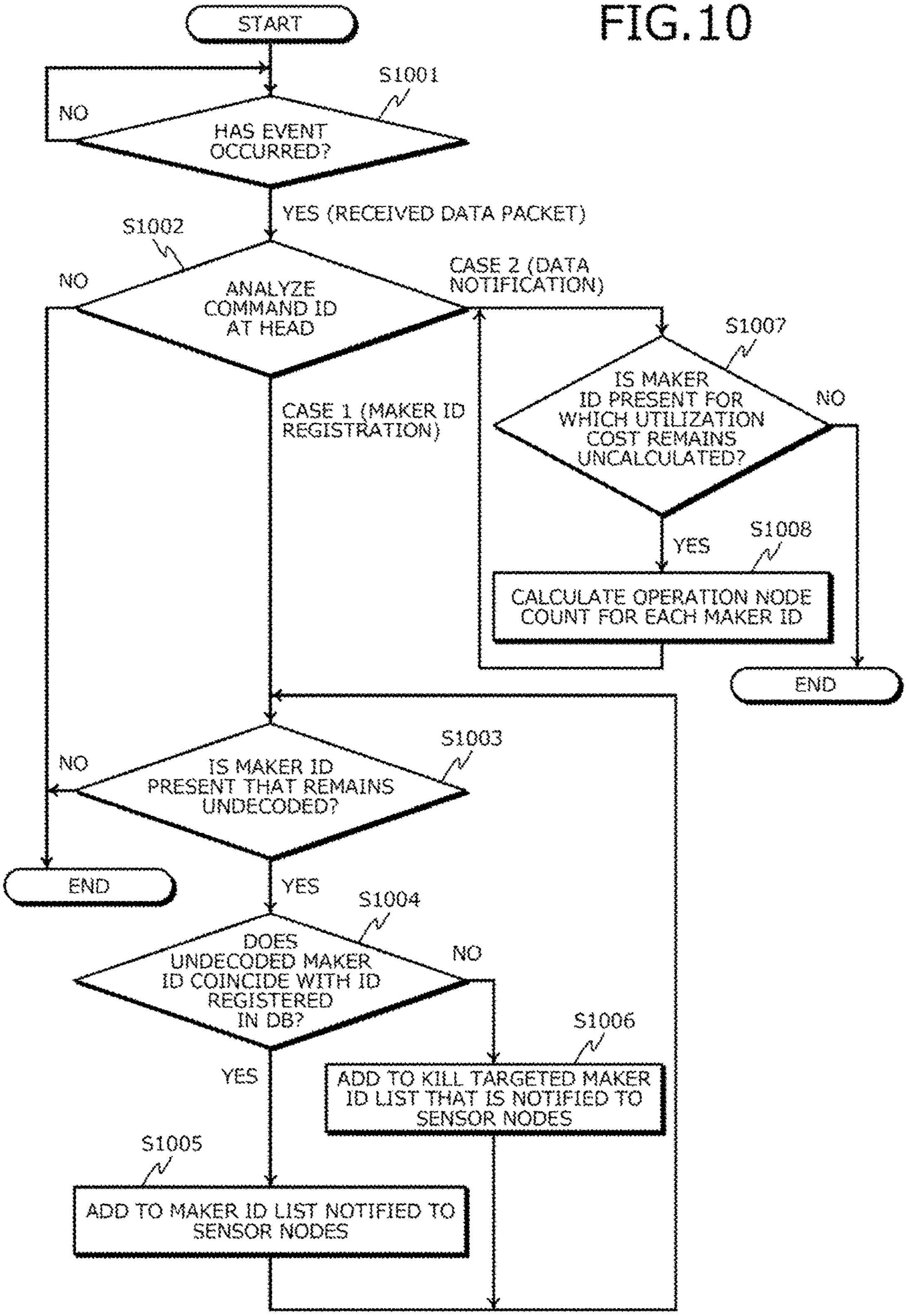
FIG. 10 is a flowchart depicting details of processing performed by the data network management apparatus.

FIG. 10 is a flowchart depicting details of processing performed by the data network management apparatus. Processing performed by the CPU 501 of the data network management apparatus 130 during the above construction and operation will be described.

First, the CPU 501 waits for an event to occur (step S1001: NO). When an event of receiving a data packet occurs (step S1001: YES, data packet reception), the CPU 501 analyzes the command ID at the head of the received data packet (step S1002).

When the command ID of the packet head is maker ID registration (step S1002: Case 1), the CPU 501 transitions to step S1003. When the command ID of the packet head is data notification (step S1002: Case 2), the CPU 501 transitions to step S1007. When the command ID of the packet head corresponds to neither Case 1 nor Case 2 (step S1002: NO), the CPU 501 ends the processing.

At step S1003, the CPU 501 determines whether among the maker IDs registered by the builder, etc. during construction, a maker ID is present that remains undecoded (not processed) (step S1003). If an undecoded maker ID is present (step S1003: YES), the CPU 501 transitions to step S1004, and if no undecoded maker ID is present (step S1003: NO), the CPU 501 ends the processing since all maker IDs have been analyzed.

At step S1004, the CPU 501 determines whether the undecoded maker ID coincides with an ID registered in the database (DB) (step S1004). If the determination result is that the undecoded maker ID coincides (step S1004: YES), the CPU 501 adds the undecoded maker ID to an (authenticated operation-targeted) maker ID list notified to the sensor nodes 101 (step S1005). If the determination result is that the undecoded maker ID does not coincide (step S1004: NO), the CPU 501 adds the undecoded maker ID to a kill targeted maker ID list that is for function kill and notified to the sensor nodes 101 (step S1006). After the processing at step S1005 or step S1006, the CPU 501 returns to step S1003.

At step S1007, the CPU 501 determines whether a maker ID is present for which utilization cost remains uncalculated (step S1007). If the determination result is that a maker ID is present for which utilization cost remains uncalculated (step S1007: YES), the CPU 501 calculates an operation node count for each maker ID (step S1008), and returns to step S1007. As a result, utilization cost for each maker is calculated corresponding to the respective counts of authenticated sensor nodes 101 installed in the installation area A. If the determination result is that no maker ID is present for which utilization cost remains uncalculated (step S1007: NO), the CPU 501 ends the processing.

An example of management processing performed by the data network management apparatus 130 will be described. For example, as described above, during construction, the sensor nodes 101 of authenticated and permitted makers are permitted to operate, and the sensor nodes 101 of non-authenticated, non-permitted makers can be function killed. As a result, even after the sensor nodes 101 have been installed in the installation area A, operational control of the sensor nodes 101 according to maker is performed.

Further, during operation of the sensor nodes 101, the sensor nodes 101 count and transmit to the data network management apparatus 130, hop counts for transferring data from other sensor nodes 101. As a result, at the data network management apparatus 130, operation counts for the respective sensor nodes 101 corresponding to the maker IDs can be calculated.

Figure 11:
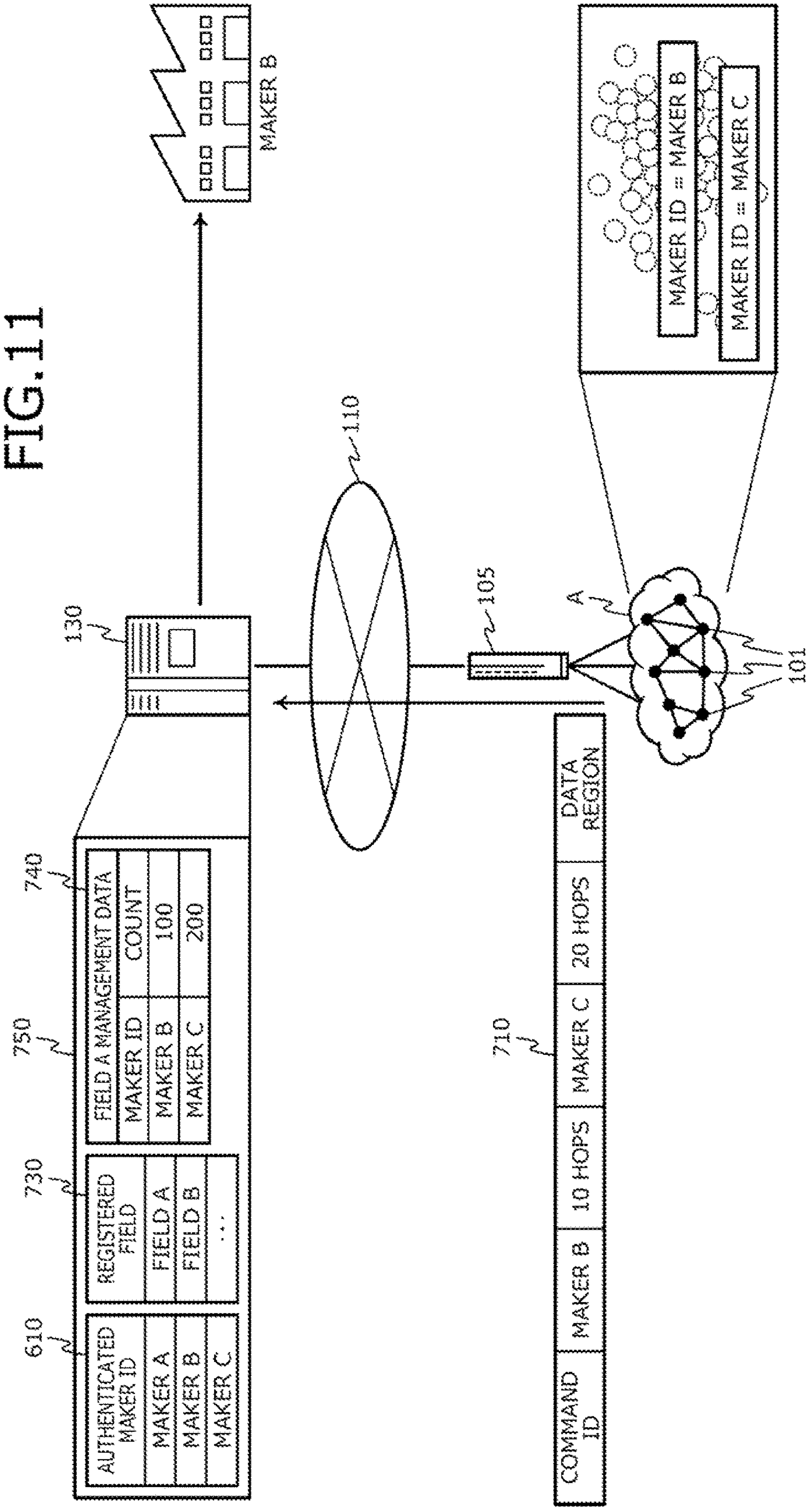
FIG. 11 is a diagram depicting an example of processing for utilization cost distribution performed by the data network management apparatus.

FIG. 11 is a diagram depicting an example of processing for utilization cost distribution performed by the data network management apparatus. As described with reference to FIG. 7, the data network management apparatus 130 can calculate for each maker, an operation count of the respective sensor nodes 101, based on the count values included, for each maker ID, in the data packets 710 transmitted from the sensor nodes 101. The data network management apparatus 130, using the operation count, can distribute the utilization cost to the makers. For example, the manager (management organization) of the installation area A pays the equivalent of this utilization cost.

Description will be given taking a more detailed example where the distributed utilization cost each time 1 sensor node 101 performs sensing 1 time and outputs sensing data 1 time is assumed to be 1 yen. As described above, according to the contents of the data packet 710, a result for operation is assumed to be obtained where for the sensor nodes 101 of maker B, the operation count=$(x+y)\times a/(a+b)=100$ (nodes). A case where 10 sensing events have occurred is assumed and the data network management apparatus 130 calculates based on the operation count, a utilization cost=$1\times 100\times 10=1000$ (yen) for maker B. By the same computation, distributed utilization costs can be obtained for other makers as well. Although utilization cost distribution based on the occurrence count of sensing data has been taken as an example, the utilization cost may be distributed based on other communication amounts such as the transmission frequency of sensing data when transmitted by the sensor nodes 101 periodically.

The utilization cost is calculated based on sensor nodes 101 that are of an authenticated and permitted maker and that have actually operated and output sensing data and therefore, can be accurately calculated based on actual operation. Further, even when numerous sensor nodes 101 of various makers are present in the installation area A, the utilization cost can be calculated according to maker.

In the embodiment above, in the authentication of the sensor nodes 101, although maker IDs are used as identification information of the sensor nodes 101 in making the determination, the identification information used in authentication is not limited to maker. For example, configuration may be such that in the determination other forms of identification information are used such as intrinsic performance (sensing type count, a CPU processing performance index, etc.) specific to the sensor node 101, factors that change consequent to sensor node 101 operation (warranty period indicative of durability, values that change over time such as data transmission counts, year and month of manufacture), etc. or plural conditions in combination with the maker ID. Such information can be retained in the non-volatile memory 208, etc. and used by being read out like the maker ID. Based on such variable factors, intrinsic performance, etc., the data network management apparatus 130 performs control to authenticate in the installation area A, sensor nodes 101 that satisfy required performance and to not authenticate sensor nodes 101 whose durability has deteriorated. In this manner, the data network management apparatus 130 may use identification information and dynamically change authentication conditions.

As described, in the embodiment, with the transmission of sensing data of a sensor node, identification information of the sensor node is transmitted to the data network management apparatus, and the sensor node is authenticated by the data network management apparatus, based on the identification information. As a result, even for a sensor node for which the processing performance is low, the sensor node can be authenticated without imposing processing load. In particular, small sensor nodes installed in large number in the installation area can be authenticated by simple processing. Authenticated sensor nodes satisfy prescribed performance, given data accuracy, etc. and therefore, the operation of the sensor nodes installed in large number in the installation area can be guaranteed and the accuracy of data collection can be increased.

Further, since the sensor nodes transmit sensing data together with data transmission counts, the data network management apparatus, during operation, can always properly assess the operation counts of the sensor nodes in operation. Calculation of an equivalent value based on operation count can be calculated. Further, for example, distribution of utilization cost and operation count according to maker can be calculated using maker IDs. In this case, assessment of durability and performance, etc. according to maker is enabled, enabling large distribution of utilization cost to makers for which the operating state is favorable.

Although the unit cost of the sensor nodes is low, when a large number of the sensor nodes, such as tens of thousands to hundreds of thousands is installed in the installation area, during construction, a transient large installation cost burden is incurred. Concerning this point, after actual operation, by distributing the utilization cost according to the operation counts, a model that reduces the cost burden at construction can be built and the system above performs processing adapted for the built model.

In the present embodiment, a data network is described that transmits to the data network management apparatus (data collecting apparatus that is a higher level apparatus), information related to detection at a sensor node. Nonetheless, application is not limited hereto and the disclosure is further applicable to the authentication of sensor nodes in a data network that transmits data from a higher level apparatus to plural nodes (corresponds to the sensor nodes).

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A data network management system comprising:

a data network management apparatus; and a plurality of data processing apparatuses each of which is installed in an installation area and includes:

memory configured to store therein identification information indicating a manufacturer of the data processing apparatus; and a processor configured to:

process data;

transmit the data and the identification information to the data network management apparatus;

receive notification from the data network management apparatus; and operate or suspend operation of the data processing apparatus based on the notification, and the data network management apparatus determines based on the identification information received from the plurality of data processing apparatuses and second identification information of data processing apparatuses that have completed an authentication test for guaranteeing a given data accuracy, a first data processing apparatus from which the data is to be obtained among the plurality of data processing apparatuses, wherein the processor is further configured to:

receive from the data network management apparatus, a manufacturer list for the plurality of data processing apparatuses installed in the installation area;

analyze whether the manufacturer of the data processing apparatus is included in the manufacturer list; and increment a count value that corresponds to the manufacturer of the data processing apparatus, when a result of analysis indicates that the manufacturer of the data processing apparatus is included in the manufacturer list; and incorporate the count value into the data to be transmitted to the data network management apparatus, the count value used to determine utilization cost by the network management apparatus, wherein the data network management apparatus obtains based on the identification information received from the plurality of data processing apparatuses, an operation count of at least one data processing apparatuses that are operating in the installation area among the plurality of data processing apparatuses, and the data network management apparatus calculates the utilization cost for each manufacturer, based on information of the manufacturer, the count value, the operation count, and transmission frequency of the data from the plurality of data processing apparatuses.

2. The data network management system according to claim 1, wherein the data network management apparatus, based on the identification information received from the plurality of data processing apparatuses, gives notification of operation permission to the first data processing apparatus from which the data is to be obtained and gives notification of operation suspension to data processing apparatuses among the plurality of data processing apparatuses and exclusive of the first data processing apparatus, and each of the plurality of data processing apparatuses has a state transitioning circuit configured to operate or suspend operation of the data processing apparatus, based on the notification from the data network management apparatus.

3. The data network management system according to claim 1, wherein at least one of the plurality of data processing apparatuses is used as a parent node communicably connected with the data network management apparatus.

4. The data network management system according to claim 1, wherein each of the plurality of data processing apparatuses has a sensor configured to detect a change at an installation site, and the processor processes and transmits the change detected by the sensor.

5. The data network management system according to claim 3, wherein the parent node is disposed in plural in the installation area and collects the data from the first data processing apparatus.

6. A data processing apparatus installed in plural in an installation area, the data processing apparatus comprising:

memory configured to store therein identification information indicating a manufacturer of the data processing apparatus; and a processor configured to:

process data;

transmit the data and the identification information to a data network management apparatus;

receive notification from the data network management apparatus; and operate or suspend operation of the data processing apparatus based on the notification, and the data network management apparatus determines based on the identification information received from the plurality of data processing apparatuses and second identification information of data processing apparatuses that have completed an authentication test for guaranteeing a given data accuracy, a first data processing apparatus from which the data is to be obtained among the plurality of data processing apparatuses, wherein the processor is further configured to:

receive from the data network management apparatus, a manufacturer list for the plurality of data processing apparatuses installed in the installation area;

analyze whether the manufacturer of the data processing apparatus is included in the manufacturer list; and increment a count value that corresponds to the manufacturer of the data processing apparatus, when a result of analysis indicates that the manufacturer of the data processing apparatus is included in the manufacturer list; and incorporate the count value into the data to be transmitted to the data network management apparatus, the count value used to determine utilization cost by the network management apparatus, wherein the data network management apparatus obtains based on the identification information received from the plurality of data processing apparatuses, an operation count of at least one data processing apparatuses that are operating in the installation area among the plurality of data processing apparatuses, and the data network management apparatus calculates the utilization cost for each manufacturer, based on information of the manufacturer, the count value, the operation count, and transmission frequency of the data from the plurality of data processing apparatuses.

7. The data processing apparatus according to claim 6, further comprising a sensor configured to detect a change at an installation site, wherein the processor processes and transmits the change detected by the sensor.

8. The data processing apparatus according to claim 6, wherein at least one of the plurality of data processing apparatuses is used as a parent node communicably connected with the data network management apparatus, and when collecting the data from the plurality of data processing apparatuses, the parent node obtains an average of the count value based on an installation count and transmits the average to the data network management apparatus.

9. A data network management method of transmitting data to a data network management apparatus from a plurality of data processing apparatuses installed in an installation area, the data network management method comprising:

processing data by each of the plurality of data processing apparatuses;

transmitting to the data network management apparatus by each of the plurality of data processing apparatuses, the data and identification information indicating a manufacturer of the data processing apparatus;

receiving notification from the data network management apparatus by each of the plurality of data processing apparatuses; and operate or suspend operation by each of the plurality of data processing apparatuses based on the notification, wherein the data network management apparatus determines based on the identification information received from the plurality of data processing apparatuses and second identification information of data processing apparatuses that have completed a given authentication test for guaranteeing a given data accuracy, a first data processing apparatus from which the data is to be obtained among the plurality of data processing apparatuses, and the data network management method further comprising:

receiving from the data network management apparatus by each of the plurality of data processing apparatuses, a manufacturer list for the plurality of data processing apparatuses installed in the installation area;

analyzing by each of the plurality of data processing apparatuses, whether the manufacturer thereof is included in the manufacturer list; and incrementing by each of the plurality of data processing apparatuses, a count value that corresponds to the manufacturer thereof, when a result of analysis indicates that the manufacturer thereof is included in the manufacturer list; and incorporating by each of the plurality of data processing apparatuses, the count value into the data to be transmitted to the data network management apparatus, wherein the count value used to determine utilization cost by the data network management apparatus, wherein the data network management apparatus obtains based on the identification information received from the plurality of data processing apparatuses, an operation count of at least one data processing apparatuses that are operating in the installation area among the plurality of data processing apparatuses, and the data network management apparatus calculates the utilization cost for each manufacturer, based on information of the manufacturer, the count value, the operation count, and transmission frequency of the data from the plurality of data processing apparatuses.

10. The data network management method according to claim 9, further comprising:

giving, by the data network management apparatus, notification of operation permission to the first data processing apparatus from which the data is to be obtained and giving notification of operation suspension to data processing apparatuses exclusive of the first data processing apparatus and among the plurality of data processing apparatuses, based on the identification information received from the plurality of data processing apparatuses; and performing or suspending operation by each of the plurality of data processing apparatuses based on the notification from the data network management apparatus.

* * * * *